(12) United States Patent
Tippery et al.

(10) Patent No.: US 7,587,885 B2
(45) Date of Patent: Sep. 15, 2009

(54) CENTRAL AUGER CROP FEED SYSTEM FOR A HARVESTER

(75) Inventors: Steve Tippery, Gretna, NE (US); Craig Kaster, Omaha, NE (US); Adam Lee Haworth, Louisville, NE (US); Cristoph Nathan, Missouri Valley City, IA (US); Jens Petersen, Omaha, NE (US)

(73) Assignee: Claas Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 11/757,652

(22) Filed: Jun. 4, 2007

(65) Prior Publication Data

US 2008/0295474 A1 Dec. 4, 2008

(51) Int. Cl.
*A01D 34/00* (2006.01)

(52) U.S. Cl. ........................................ 56/14.5
(58) Field of Classification Search .................. 56/14.4, 56/14.5, 181, 158, 228; 198/604; 474/237
See application file for complete search history.

(56) References Cited

U.S. PATENT DOCUMENTS

| | | | |
|---|---|---|---|
| 2,455,905 A | | 12/1948 | Ronning et al. |
| 2,455,906 A | * | 12/1948 | Ronning et al. ............... 56/364 |
| 2,671,553 A | * | 3/1954 | Herndon ..................... 198/604 |
| 2,867,958 A | * | 1/1959 | Allen ........................ 56/15.7 |
| 3,110,246 A | * | 11/1963 | McConeghy Jr. et al. ... 100/139 |
| 3,118,265 A | * | 1/1964 | Shaver ....................... 56/14.4 |
| 3,132,459 A | * | 5/1964 | Grillot ........................ 56/341 |
| 3,304,699 A | * | 2/1967 | Koch et al. ................... 56/14.4 |
| 4,011,709 A | * | 3/1977 | Mott et al. .................... 56/10.4 |
| 4,177,626 A | | 12/1979 | McNaught |
| 4,300,333 A | | 11/1981 | Anderson |
| 4,341,061 A | * | 7/1982 | Denzin ........................ 56/192 |
| 4,362,006 A | * | 12/1982 | Denzin ........................ 56/192 |
| 4,444,000 A | * | 4/1984 | Enzmann et al. ............. 56/15.6 |
| 4,800,711 A | * | 1/1989 | Hurlburt et al. ............... 56/219 |
| 4,938,010 A | | 7/1990 | Guinn et al. |

(Continued)

FOREIGN PATENT DOCUMENTS

WO    WO 0074467 A1  *  12/2000

*Primary Examiner*—Árpád Fábián-Kovács
(74) *Attorney, Agent, or Firm*—Robert C. Haldiman; Husch Blackwell Sanders LLP (57) ABSTRACT

A header for a combine or harvester has a frame with a longitudinal dimension transverse to a direction of travel of the combine or harvester. Two moving belts are disposed on the frame to receive cut crop from a cutter and to move the crop from outer portions of the header towards an inner portion of the header. Each of the belts has a leading edge oriented towards the direction of travel of the combine or harvester and a trailing edge oriented away from the direction of travel and each of the belts has an inner aspect disclosed in spaced relation to an inner aspect of the other of the belts such as to define a gap therebetween, the gap receiving cut crop being transported longitudinally and inwardly from the belts. An auger with a cylinder and two end cones around an axis is disposed to urge crop from the gap and from the inner aspect of the belts towards a feeder house position behind the gap. The axis of the auger is forward of the trailing edge of the belt. A stationary floor plate beneath the gap is contoured to urge crop into the feeder house.

21 Claims, 10 Drawing Sheets

U.S. PATENT DOCUMENTS

| | | | |
|---|---|---|---|
| 4,956,966 A * | 9/1990 | Patterson | 56/181 |
| 5,005,343 A | 4/1991 | Patterson | |
| 5,243,810 A * | 9/1993 | Fox et al. | 56/228 |
| 5,464,371 A | 11/1995 | Honey | |
| RE35,543 E * | 7/1997 | Patterson | 56/14.4 |
| 5,711,140 A * | 1/1998 | Burmann | 56/208 |
| RE37,267 E * | 7/2001 | Mosby | 56/13.9 |
| 6,817,166 B2 | 11/2004 | Dunn | |
| 6,865,871 B2 | 3/2005 | Patterson et al. | |
| 2002/0129591 A1 | 9/2002 | Patterson et al. | |
| 2004/0148919 A1 | 8/2004 | Dunn | |
| 2005/0016147 A1 | 1/2005 | Patterson et al. | |
| 2005/0284124 A1 * | 12/2005 | Patterson | 56/364 |
| 2007/0193243 A1 * | 8/2007 | Schmidt et al. | 56/181 |

\* cited by examiner

CENTRAL AUGER CROP FEED SYSTEM FOR A HARVESTER

BACKGROUND OF THE INVENTION

1. Field of the Invention

The present invention is in the field of headers for combines and harvesters, particularly "draper" headers.

2. Related Art

Combines and harvesters having headers with conveyor belts, often called "drapers," are known in the art. The belts convey cut crop from the outer ends of the header towards the center of the header for feeding into the combine feeder house. In a typical prior art header, two lateral conveyor belts whose longitudinal dimension would be perpendicular to the direction of travel of the combine, transport crops to the center of the header by rotating their top surface from the outside in. Then a third belt with a direction of rotation parallel to the direction of travel of the vehicle, was disposed between and underneath the inside ends of the lateral belts. This belt would catch the crop from both lateral belts and transport it back into the feeder house, usually with the help of an auger disposed behind the center belt and the back header wall. A representative example of such a prior art configuration is U.S. Pat. No. 6,865,871 B2.

In prior art machines, crop traveling to the feeder house from the lateral belts thus made essentially a sharp ninety degree turn as it left the inner end of the lateral belts and was then conveyed by the center belt in a perpendicular direction. (See FIG. 1A, prior art.) This ninety degree turn could lead to disadvantageous misalignments and interruption of flow of long stalk crops as they were fed into the feeder house. It also suppressed the speed at which the belts could turn and the speed at which the combine could process crop because at higher speeds crop could bunch, jam, hesitate or enter the feeder house misaligned.

Additionally, the center belt would receive crop cut from directly in front of it. This crop falling onto the center belt simultaneously with the center belt receiving opposing crop feeds from the lateral belts caused additional turbulence and potential for disadvantageous bunching, jamming or interrupted flow of the crop as it was received from the three perpendicular directions. Overloading of the center belt can cause reduced speed and capacity, and plugging of excess crop under the side belts. Accordingly, there has been a need in the art for a smoother crop feed path into the feeder house for belt or draper headers in order to realize advantageous increases in speed and throughput.

There is a continuing need in the art to reduce the complexity of assemblies, and thereby reduce the opportunity for mechanical breakdown or crops jamming between components. There is a further continuing need for durability, economy and efficiency.

SUMMARY OF THE INVENTION

The present invention is an improved crop feed path in a belt header into a combine or harvester feeder house. It is determined, surprisingly, that removing the center belt or draper as disclosed herein improves the efficiency of crop feeding and yields a smoother transition from lateral feed into the feeder house.

A header for a combine or harvester has a frame with a longitudinal dimension transverse to a direction of travel of the combine or harvester. Two moving belts are disposed on the frame to receive cut crop from a cutter and to move the crop from outer portions of the header towards an inner portion of the header. Each of the belts has a leading edge oriented towards the direction of travel of the combine or harvester and a trailing edge oriented away from the direction of travel and each of the belts has an inner end disposed in spaced relation to an inner end of the other of the belts such as to define a gap therebetween. The gap receives cut crop being transported longitudinally and inwardly from the belts. An auger with a cylinder around an axis is disposed to urge crop from the gap and from the inner aspect of the belts towards a feeder house position behind the gap.

In certain aspects of the invention, the auger has two end cones. The axis of the auger may be forward of the trailing edge of the belt. A stationary floor plate beneath the gap is contoured to urge crop into the feeder house.

In certain other aspects of the present invention, forward reaching fingers protruding from the cylinder of the auger may be adjustable. An adjustment mechanism may be externally accessible. Drive units for the auger may be mounted internally inside the cylinder and end cone assemblies, mounted externally adjacent to the auger on the hangers supporting the auger, or mounted externally removed from the auger. The auger may be complemented by compression shafts spanning from the end cones to a position on the header farther outward than the end cones and above them. Drive units may be mounted at this outer lateral position and the cylinder and end cones driven through the compression shafts thereby acting as drive shafts as well. The auger may be mounted on the header frame to float up and over variations in the crop mass flowing underneath it and may also be fully removable. Spaced relations between the inner ends of the belts and the end cones and the floor plate may be adjusted to optimize crop flow.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 2:
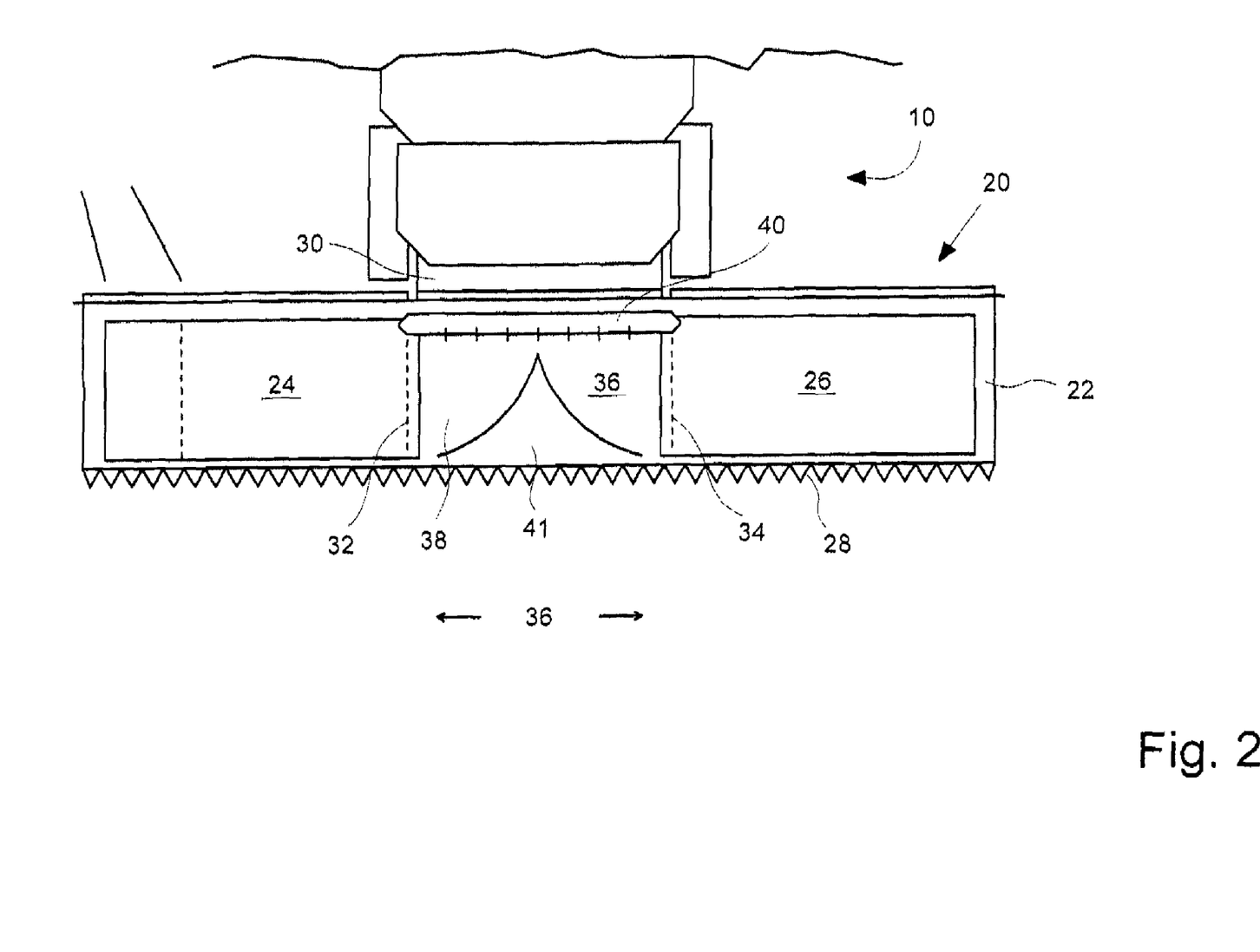
FIG. 2 is a top view of a combine having a belt header.

Referring now to the drawings in which like reference numbers correspond to like elements, FIG. 2 is a schematic top view of a combine or harvester 10 having a header 20. Generally, the header is comprised of a frame 22 supporting two opposing crop conveying belts 24 and 26, sometimes known to those of skill in the art as "drapers." The leading edge of the header 20 includes a cutter bar 28. A reel disposed over the cutter bar and the leading edge of the belts 24 and 26 is omitted for clarity. The object of feeder systems is to direct crop cut by the cutter bar 28 into a conventional opening in the front of a feeder house 30, through which cut crop travels rearwards to be further threshed and processed within the combine or harvester. In the depicted embodiment, the header is fixedly attached to a feeder house Each conveyor assembly 24 and 26 is supported on a frame including rollers 32 and 34. An inner aspect of each belt 24 and 26 terminates at an inner edge of the conveyor belt as it turns around rollers 32 and 34. This inner terminus of the belts defines a gap 36 there between. Rollers 32 and 34 may be longitudinally adjustable in order to vary width of gap 36. One means of such adjustment are disclosed in copending application attorney reference no. 59156-134, which is incorporated by reference herein. Underlying the gap 36 is a floor plate 38.

Contoured Floor Plate

Floor plate 38 is static in the depicted embodiment, and during operation does not move relative to the other header components. The top surface of the floor plate 38 includes a contour 140 shaped to advantageously urge cut crop towards a rear position in the center of the header 20 which has a through hole corresponding to the opening through hole of the feeder house 30. In the embodiment depicted in FIG. 5, contour 140 at the leading edge of floor plate 38 is raised vertically 142 relative to the trailing portion of floor plate 38. The vertical height may vary. The crop feed system, apparatus and method of the present invention directs cut crop towards this feeder house position at the rear and center of the header 20 from both left and right belts 24 and 26, as well as crop received directly on to the floor plate 38 from a center portion of the cutter bar 28 located directly ahead of the floor plate 38.

Figure 5:
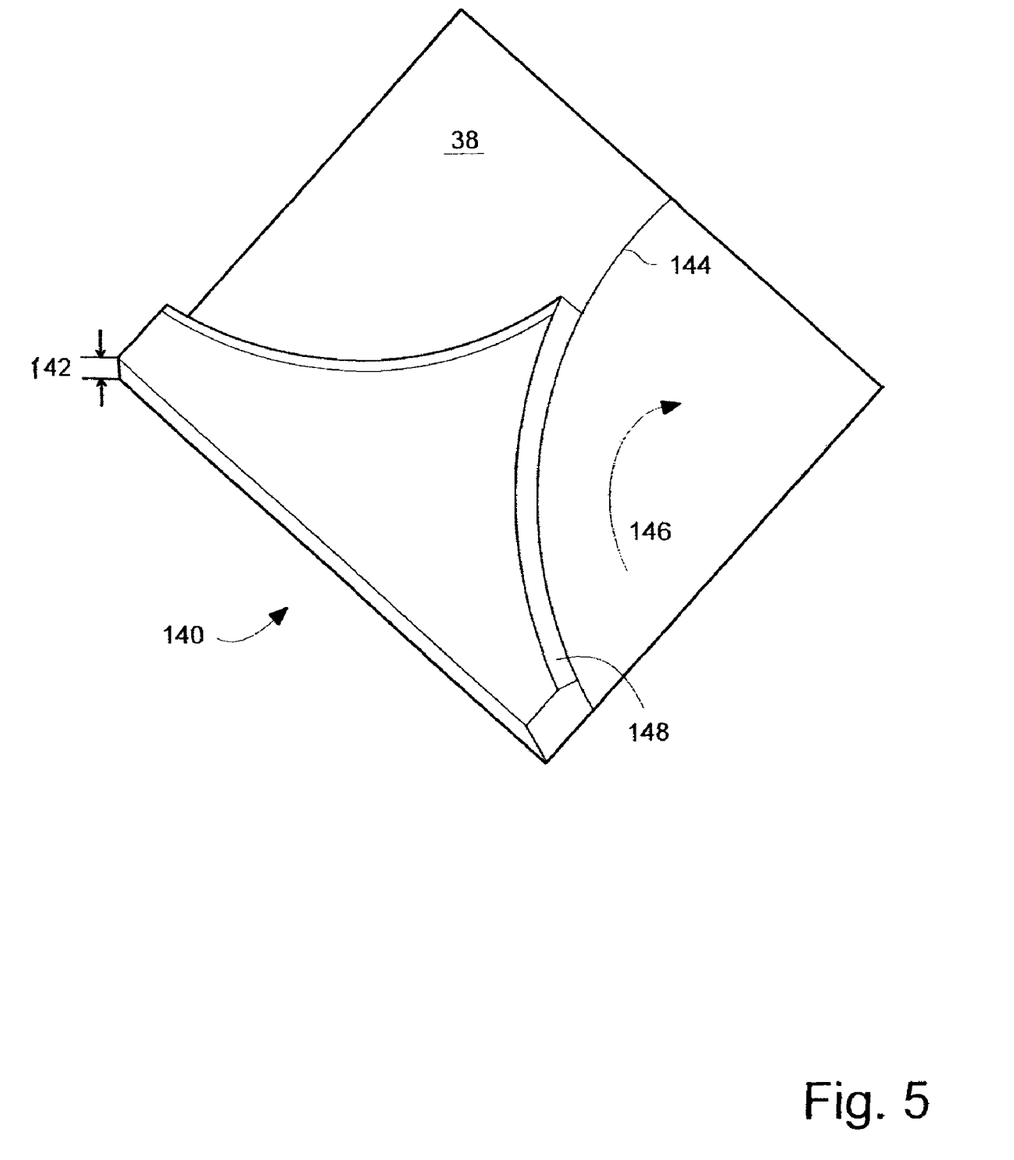
FIG. 5 is a close up view of the contoured floor plate.

The floor plate contour is designed to urge crop in a smooth path from the lateral direction in which it is received by the floor plate towards the rear of the combine and into the feeder house. In the depicted embodiment this contour is substantially a chevron, with its apex pointed towards the rear of the combine. Additionally, as depicted in FIG. 5, the chevron is curvilinear, with its legs being convex towards the chevron center axis 144. Thus, in the depicted embodiment, the contour of the floor plate describes a smooth flow path 146 eliminating any sharp angle or right angle turns in the crop flow path. The crop feed path substantially defined by the depicted contour has a gently radiused curve 146 from the leading edge of the belt at its inner end and curving to the center 144 of the floor plate and in alignment with the center of the feeder house. Contour edges may be faceted 148. As depicted in FIGS. 1B and 1C, the cut ends of stalk crops would be received from the leading edge of the lateral belt and urged rearwardly into the feeder house along each leg of the contour chevron. As depicted, this crop path would maintain an orientation of the cut crop that is substantially parallel to the direction of travel of the combine. The top ends of the cut crop would be received from the trailing edge of the lateral belt and proceed substantially diagonally and rearwardly into the feeder house. An additional advantage of the rear facing apex of the floor plate chevron is to more effectively clear crop from underneath the auger 40 in the event that the operator reverses the rotation of the auger for that purpose.

The floor plate position, the vertical thickness of the floor plate, its contour and its elevation relative to the height of the top surface of the lateral belts allows for crop that is cut by the cutter bar directly in front of the floor plate to fall onto the top of the contour of the floor plate and be urged by the floor plate and propelled by the auger rearwardly into the feeder house in smooth conjunction with the floor plate's receipt of the cut crop from the lateral belts. These cut stalks would also remain substantially parallel with the direction of travel of the combine as they progress from the cutter bar into the feeder house.

An auger 40 is disposed over the floor plate 38 and forward of the feeder house position such that it is disposed to urge and feed crop on the floor plate 38 back through the feeder house position and into the feeder house 30.

Figure 3:
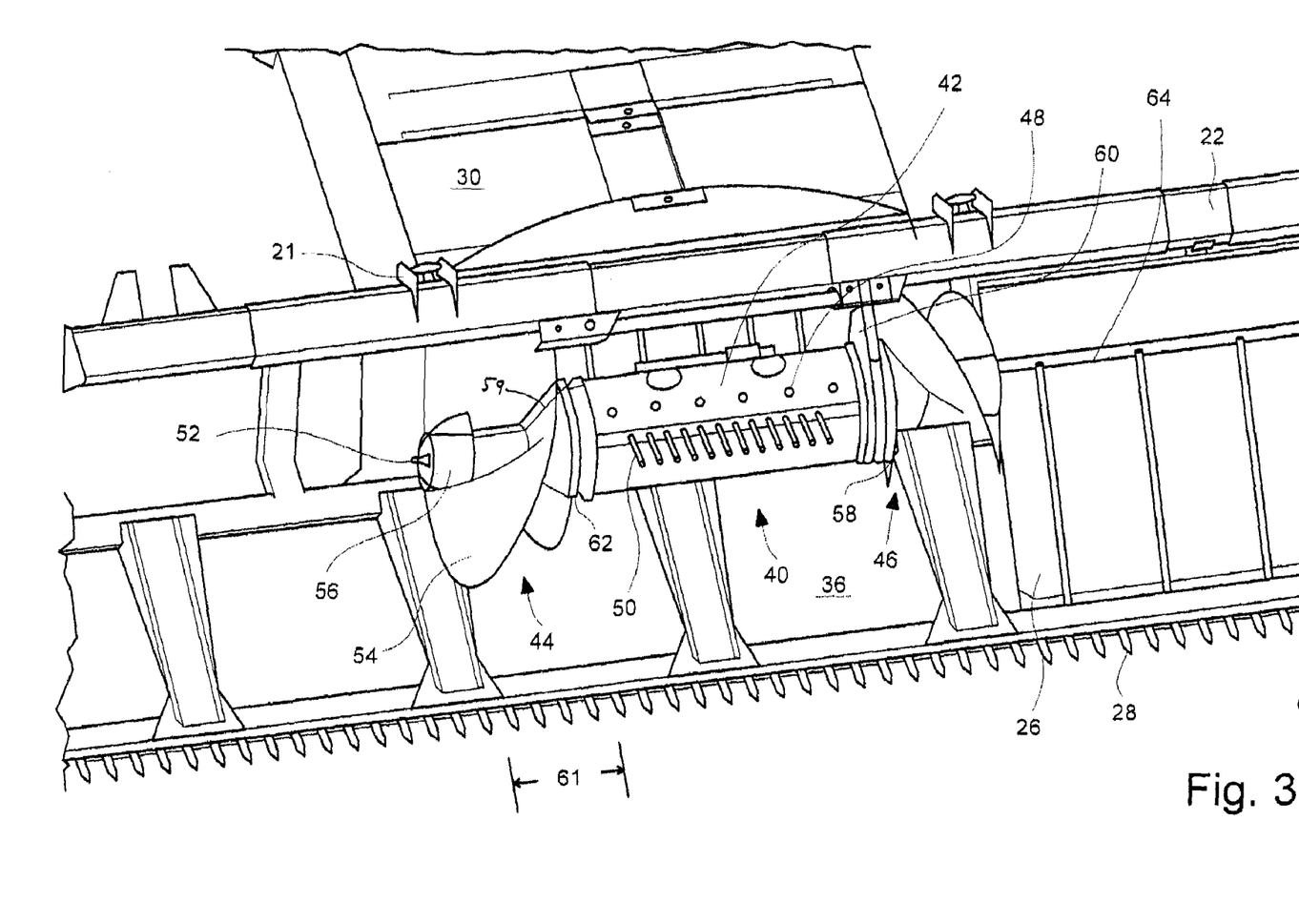
FIG. 3 is a perspective view, partially cut away, of a belt header.

FIG. 3 is a perspective view of the feed system and apparatus with the floor plate and one belt removed for clarity. Auger 40 is disposed over gap 36. Auger 40 is comprised of a central cylinder 42 and two end cones 44 and 46. The central cylinder 42 includes a plurality of through holes 48 through which extend a plurality of finger pins 50. Finger pins 50 are mounted within the cylinder 42 so as to extend farther in a forwards direction than in a rearwards direction outside the circumference of the cylinder 42, in order to better engage crop forward of the auger 40 and, in its rotation, to urge the crop underneath the auger and towards the feeder house position behind the auger. The entire header assembly 20 may be directly mounted on the feeder house 30 at mount 21, without the need for any adapter.

Auger 40, its central cylinder 42 and the two end cones 44 and 46 are on an axis 52. In the depicted embodiment, the end cones are each configured with two helical end flights 54 which turn around a central cylinder 56 having a diameter that is wider than the axis 52 but narrower than the central cylinder 42. Disposed adjacent to and inboard of a base end 58 and 62 of each of said end cones 46 and 44 are hangers 60. Hangers 60 support the central auger 40 and are attached to the frame 22 of the overall header 20.

Figure 4:
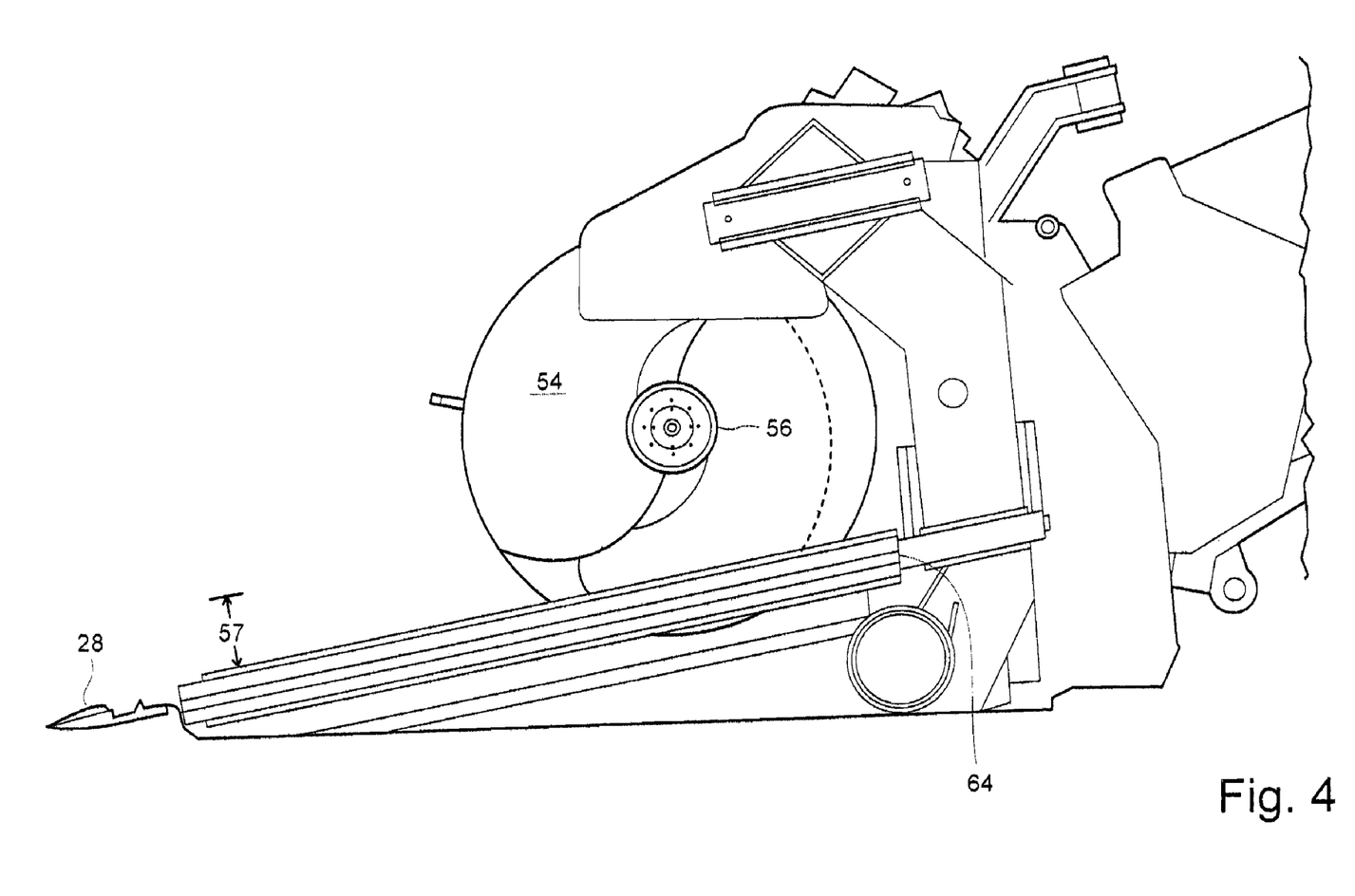
FIG. 4 is a side view of a belt header with the auger in place.

The position of the overall auger 40 in the depicted embodiment is such that its axis 52 is forward of a trailing edge 64 of the belts 24 and 26, as is best seen in FIG. 4. Optionally, the cylinder 56 of the end cones 44 and 46 may also be completely forward of the trailing edge 64 of the belts. The maximum rearwards extent of the flights 54 on the end cones 44 and 46 may also be forward of the belt trailing edge 64, or may be co-extensive with the trailing edge of the belts 64, as depicted in FIG. 4.

The spaced relations 57, 61 between the inner ends of the belts at 32 or 34 and the floor plate 38 and end cones 44 and 46 (FIGS. 3 and 4) may be selectively altered, as for example by moving the belt ends 32 or 34 in order to optimize crop flow therebetween.

Figure 1A:
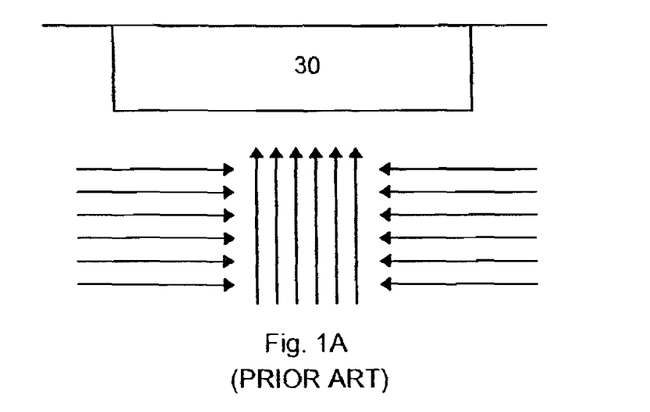
FIG. 1A is a schematic view of the prior art crop feed path.
Figure 1B:
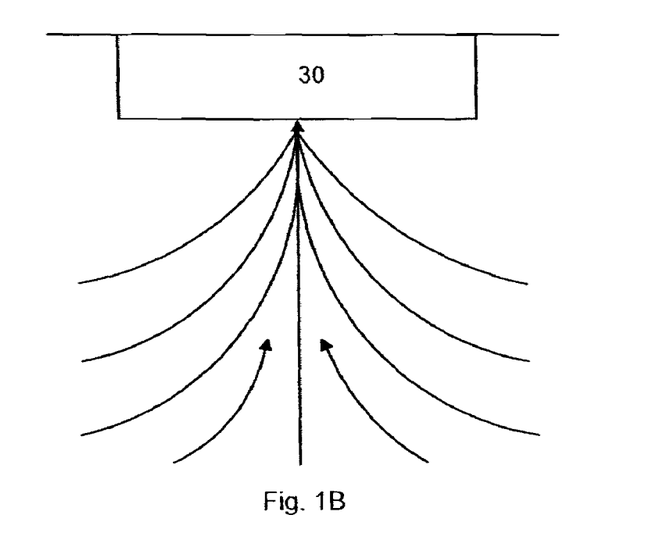
FIG. 1B is a schematic top view of a crop feed path.
Figure 1C:
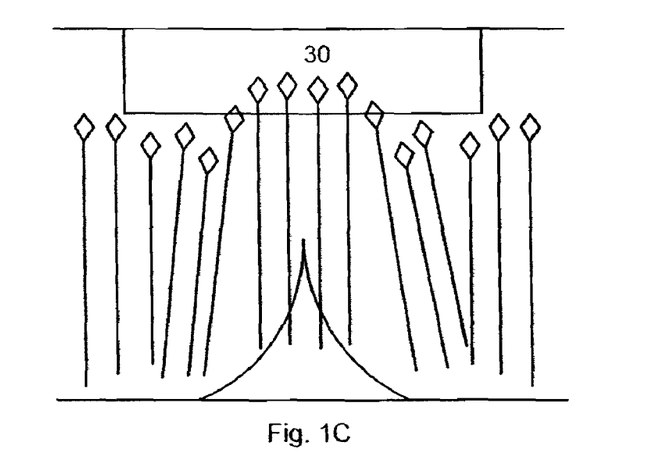
FIG. 1C is a schematic top view of the crop orientation as it travels through the feed path.

FIG. 1 schematically depicts the flow of cut crop between the inner aspect of the belts 24 and 26 and the feeder house position. FIG. 1A depicts the prior art wherein a central draper or belt is oriented to rotate parallel to the direction of travel of the combine or harvester, with the top surface moving in a rearwards direction. FIGS. 1B and 1C depict the crop flow of the present crop feed system, without a center draper belt. A more curvilinear, radiused crop flow path creates a smoother, non-turbulent flow of crop into the feeder house position. Thus, crop received laterally from the inwards movement of the side belts 24 and 26 combines with crop received from directly ahead of the floor plate 38 in a nonturbulent fashion allowing greater speed, throughput and less loss of crop material in the spaces between components.

Auger Mount

Figure 6:
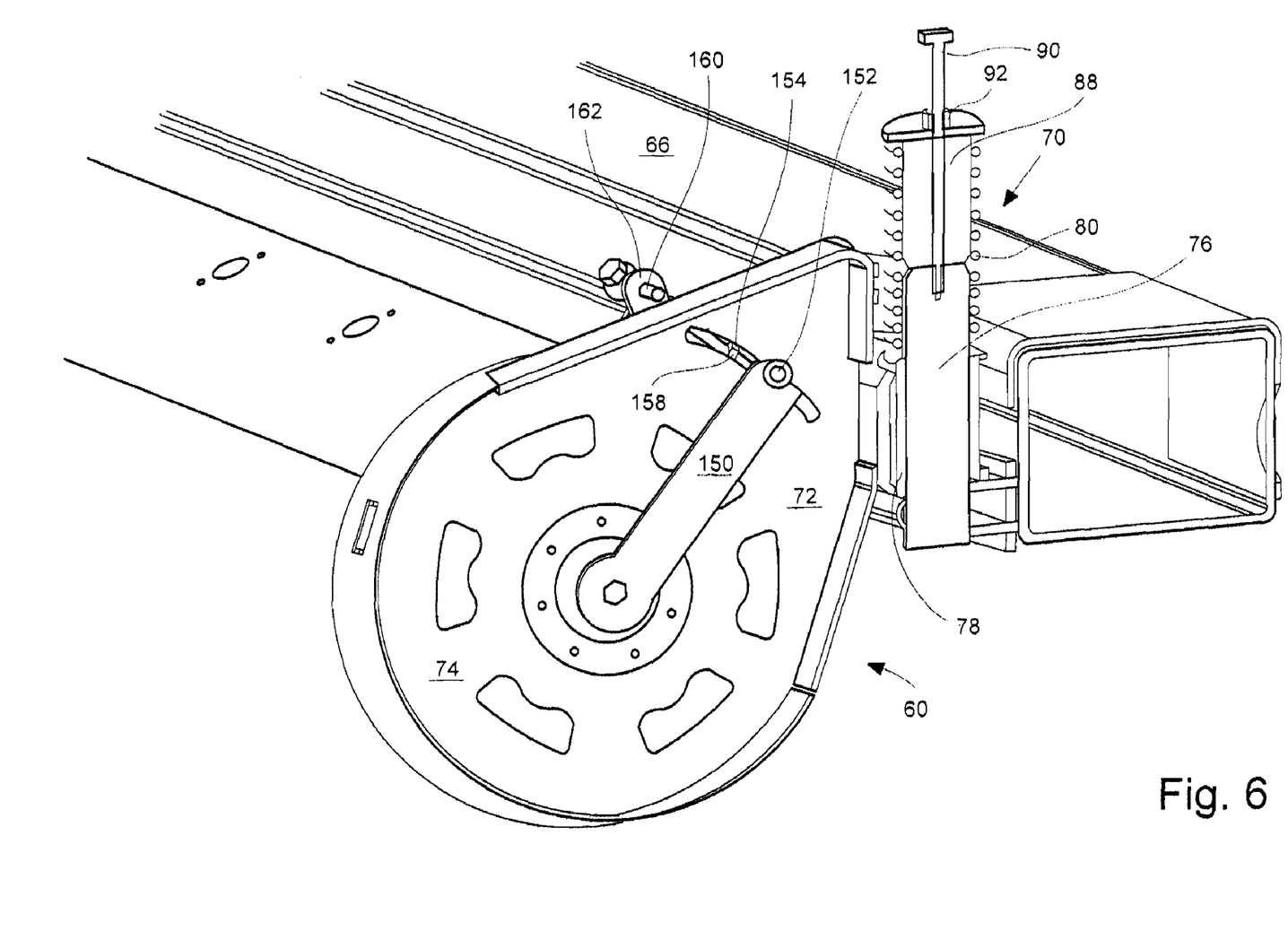
FIG. 6 is a close up cutaway perspective view of the auger hanger showing the hanger and a finger adjustment lever.

In the embodiment depicted in FIG. 6, the hangers 60 may be advantageously mounted to an upper rear bar 66 of the frame 22 of the header to allow for mobility of the auger during operation and adjustment of the auger position by an operator before operation or for maintenance. A mount 70 attaches hangers 60 to the upper frame member 66. The mount 70 engages a rearwards aspect 72 of hanger 60, while the auger itself is suspended from a forward aspect 74 of the hanger 60.

As best seen in FIG. 6, a slide pin 76 is fixedly attached to the top rail 66 of the frame 22 and, in the depicted embodiment, is oriented in a diagonal upwards and forwards position relative to the combine's direction of travel. Other directions of travel are within the scope of the invention. At the rearward aspect 72 of the hanger 60 is a slide aperture defined by the slide bracket 78. Pin 76 is slidingly engaged with slide bracket 78. Thus, the entire auger assembly may "float" or travel between a relatively upwards and forwards position and a relatively downward and rearwards position in order to respond to a compressed density of crop flowing underneath it or to increased volumes of crops flowing underneath it. The capacity of the auger assembly to ride up and over otherwise problematic variations in crop flow reduces the torque requirements for the drive motors.

This slide assembly is complemented by a compression spring 80 that biases the auger assembly downwards and rearwards in order to maintain an advantageous degree of compression of crop underneath the auger. Because the end cones are mounted on the hangers as well, they may be disposed to compress volumes of crop received laterally by them. The spring biased "float" system of the depicted embodiment supplements this end cone compression effect by allowing the auger and cones to respond to crop variations while the spring continues to apply a compressive force to the crop in all positions of the auger 40. A travel limit pin and lock nut may be mounted on the bracket in order to limit the travel of the auger assembly on the slide.

The lock pin 88, bolt 90 and lock nut 92 may be removed to allow the auger to be completely removed from the slides 76 and thereby removed entirely from the header. This external and accessible removal facility allows advantageous access for repair, and also reconfiguration of the header for swathing operations. Swathing requires lateral translation of one or both lateral belts into the gap 36 and therefore also requires avoiding the auger in some manner. This contrasts with prior art auger mounts, which were either behind the back header wall and did not need to be removed for swathing, or forward mounted augers that disadvantageously could not be removed in the field and were complex to remove anywhere. The auger removal adjustment for swathing can be made in the field with the disclosed auger mounting system.

Drive System

Figure 7:
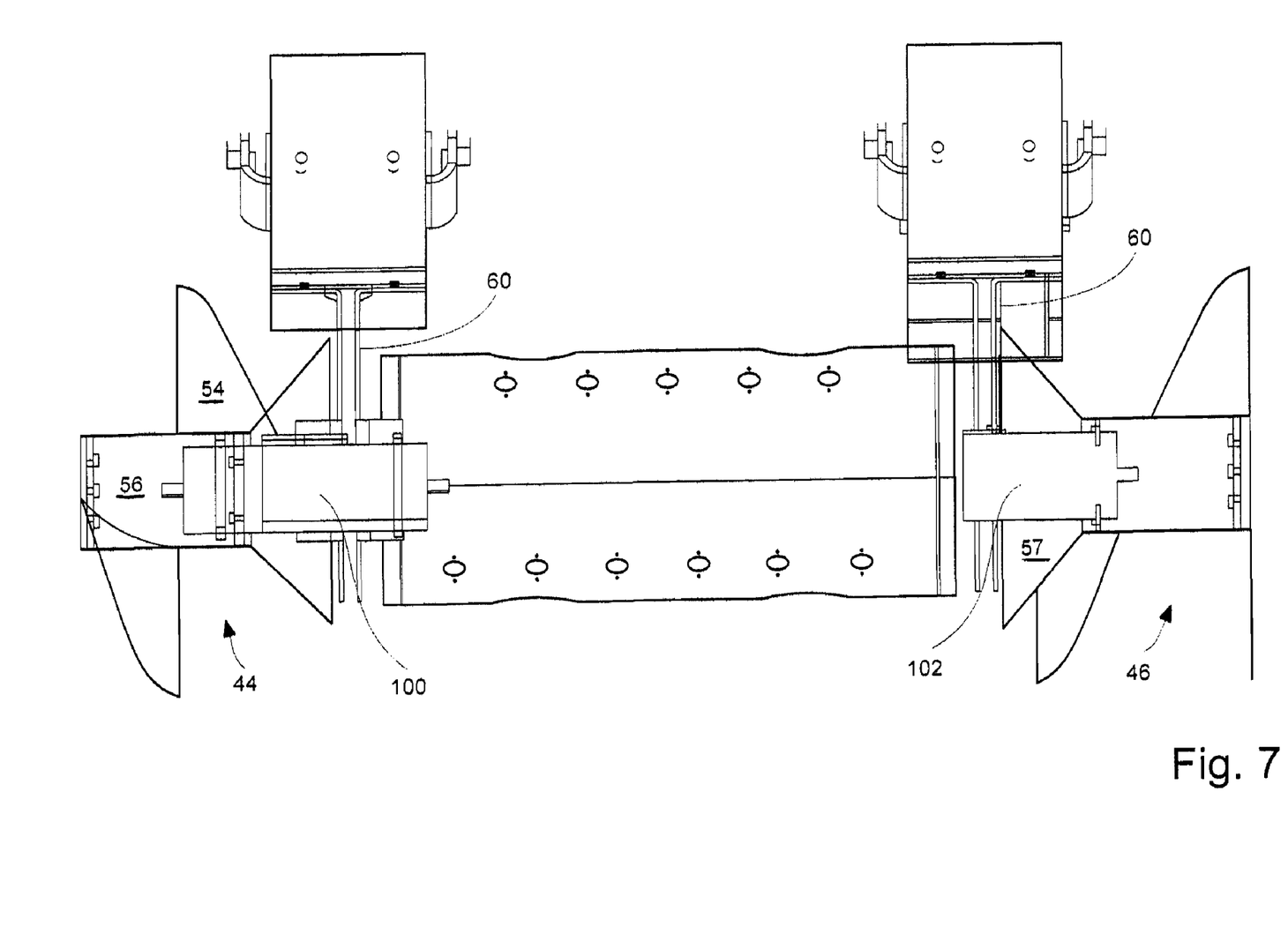
FIG. 7 is a cutaway top view showing a first drive unit placement.
Figure 8:
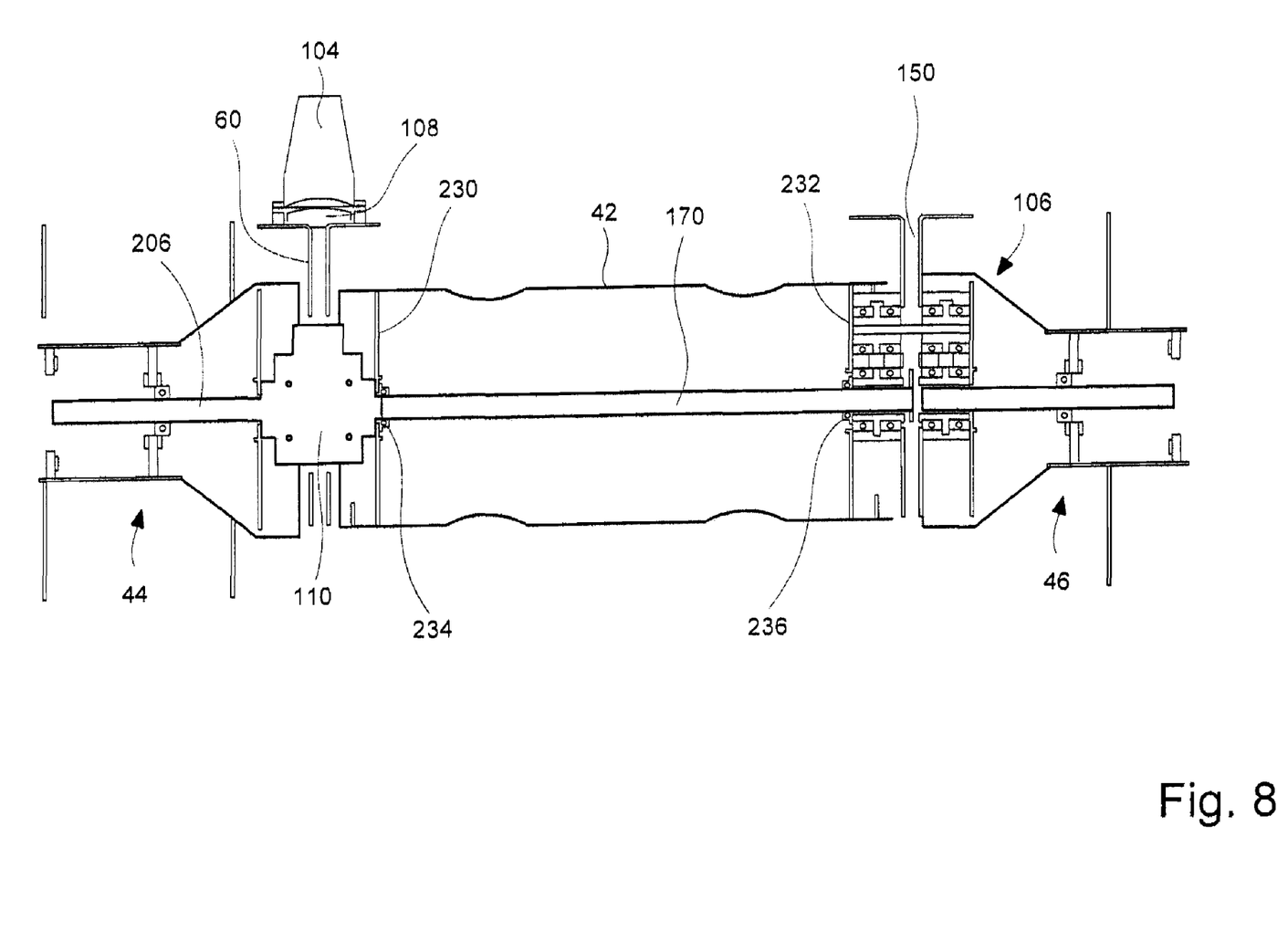
FIG. 8 is a cutaway top view showing a second drive unit placement and showing an offset crossover end cone drive gear box.
Figure 9:
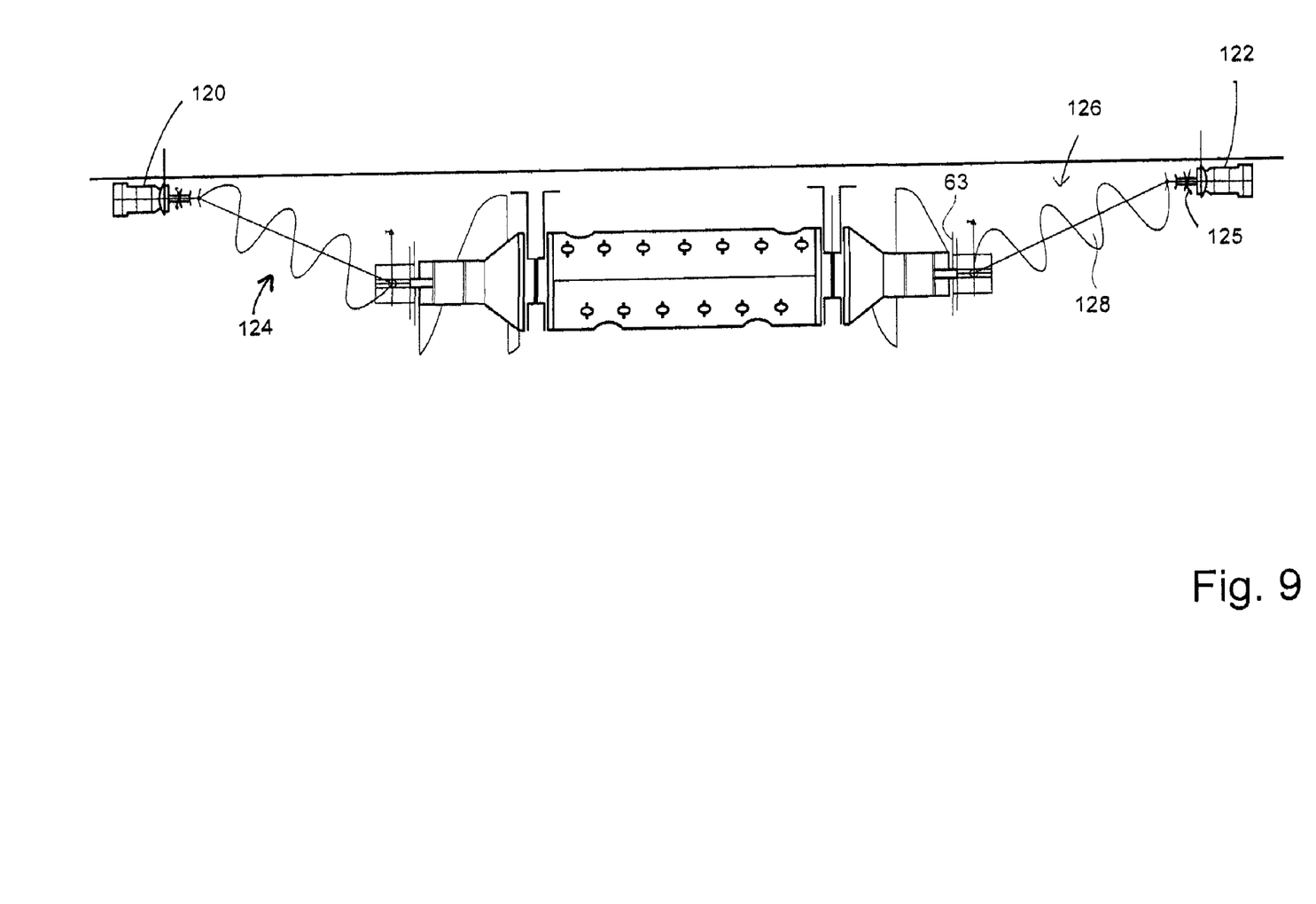
FIG. 9 is a cutaway top view showing a third drive unit placement and showing the auger with compression shafts.

As seen in FIGS. 7 through 9, several alternate drive configurations may power rotation of the auger. Each of them have in common the disposition of one drive motor, which may be a hydrostatic motor as in the depicted embodiments, to drive the center auger cylinder and at least one end cone. In some embodiments a second drive unit is disposed to drive the other end cone. The motor deployments described herein allow for a finger adjustment mechanism to be mounted on the hanger 60 on one side of the auger assembly as described below.

As best seen in FIG. 7 drive units may be mounted internally to the auger assembly. Drive unit 100 on one side is drivingly engaged to power both the rotation of the central cylinder 42 and one end cone 44. The second drive unit 102 is housed within the opposing end cone 46 and drives only that end cone. Thus, a finger adjustment assembly, may thereby be mounted on hanger 60 on the side having a second drive unit 102. This provides an external finger adjustment control mechanism which may be adjusted without disassembly of the cones or auger and which is still linked to the finger assembly inside the center cylinder 42.

As best seen in FIG. 8, the drive units may be mounted externally to the auger assembly and adjacent to it. In this configuration, drive unit 104 is mounted on a mount 108 supported by hanger 60. Its drive train powers the center cylinder and one end cone through a T-gear box 110. The drive unit drives the opposing end cone 46 through a combination of two crossover gear boxes 106, more fully described below. Center shaft 170 does not rotate.

FIG. 9 depicts a third drive system that mounts a first drive unit 120 and a second drive unit 122 externally, in laterally removed positions on the top rail 66 of the header frame 22. These drive units are drivingly engaged with compression drive shafts 124 and 126. The shafts 124, 126 proceed downwards and forwards towards their attachment with the outer lateral aspects of end cones 44 and 46 through which they drive the auger 40. The rotating connection at either end of each drive shaft is assembled with U-joints. In FIG. 9, the attaching power take off shaft may also telescope 125 to account for the floating movement of the auger.

As will be apparent to those of skill in the art, in FIG. 9 the downward angle of these compression drive shafts will serve to receive crops traveling laterally on the side belts towards the center of the header and will compress those crops downwardly between the compression drive shaft and the draper belt as the crop approaches the gap 36. Thus, crop is fed in an advantageous volume and dimension to the end cones of the overall auger assembly for advancement to the feeder house position. Such compression drive shafts are particularly advantageous with certain crops such as canola that have a larger volume for each individual stalk, that is to say, crops that are "bushier." In the depicted embodiment, the compression shafts have flights 128.

Alternatively, the compression drive shafts 124, 126 may also be rotatingly mounted at an outer end to the top rail 66 of header frame 22 so as to be used with other drive systems. The compression shafts may be attached to an auger having an internal or hanger mounted drive system such as depicted in FIGS. 7 and 8. These compression shafts may be driven through the end cones. In this configuration, the compression drive shafts may be removable by a user as a further option.

End Cones

Each cone has two flights 54. The leading edge of the flights is gently radiused and the flight cavities have a dimension large enough to positively influence the volume and capacity for pulling crops towards the feeder house position. The cone in the depicted embodiment is modified to have a first truncated frustoconical portion 59 and an outer substantially cylindrical portion 56. In the depicted embodiment, the diameter of the cylinder 56 is substantially equivalent to the radial width of the flights.

Externally Accessible Auger Finger Adjustment

Figure 10:
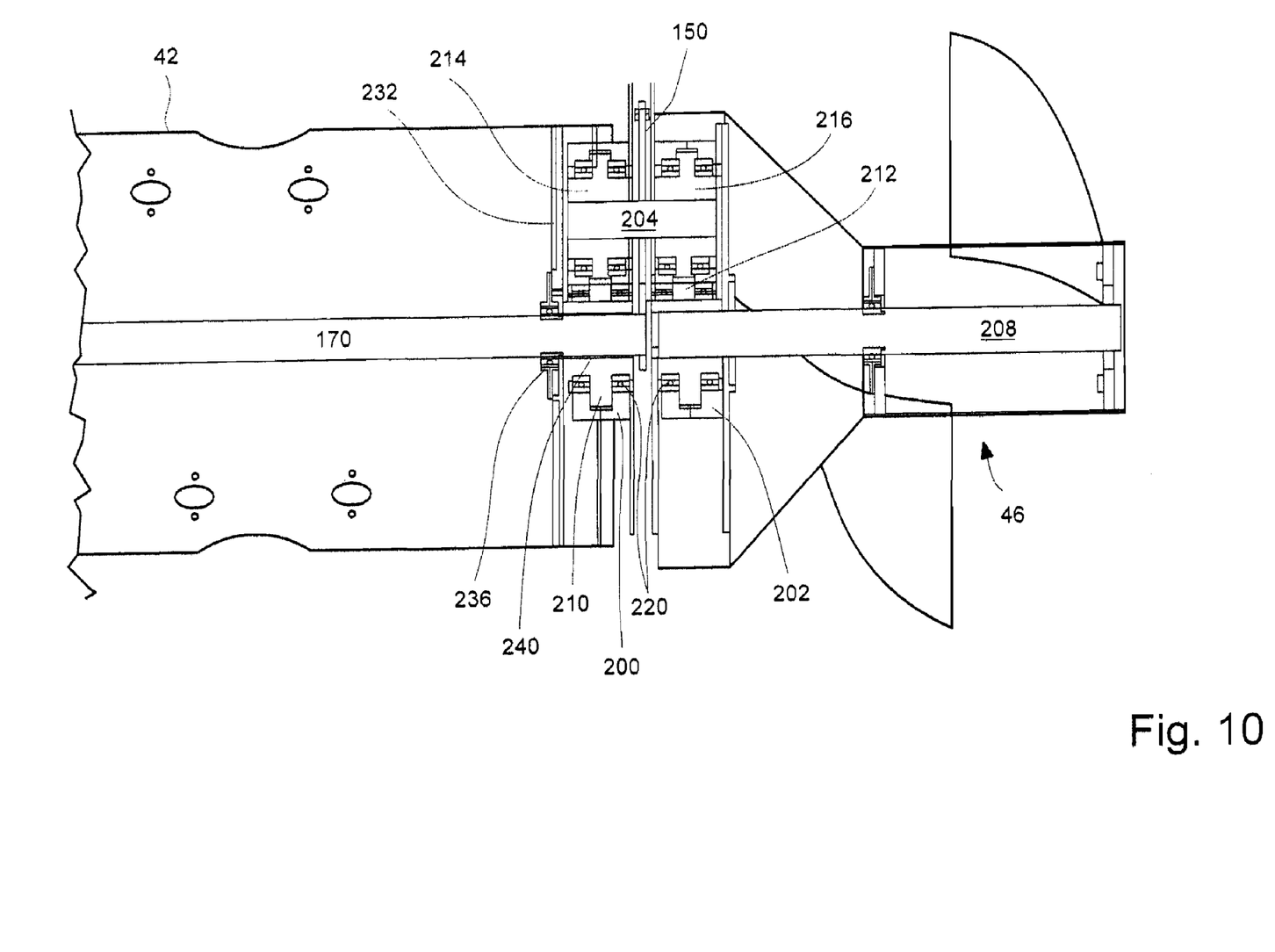
FIG. 10 is a cut away close up of the offset crossover gear train for the end cone drive.

FIG. 3 includes a view of the finger pins 50 mounted within the central cylinder 42. As seen in FIGS. 8 and 10, mounted at the axis of cylinder 42 is a shaft 170. Inboard of the hanger 60 the shaft 170 is fixedly attached to a cam. Cams attached to the shaft assembly on the opposing ends of cylinder 42 support a finger mount bar in a position which is offset from the shaft 170 and the central axis of the cylinder 42. The shaft is fixedly attached to a lever arm 150 (FIG. 6) so that rotation of the lever arm rotates the shaft 170 to adjust it and the finger mount bar attached to it internally with the cams. In FIG. 3 the pins 50 are displayed in parallel for clarity of illustration. In actual manufacture, assembly and usage, the pins are staggered or circumferentially spaced.

The mounting of shaft 170 to hanger 60 is stationary. The rotation of cylinder 42 does not rotate shaft 170 or otherwise affect the finger support assembly. Accordingly, the finger mount bar remains stationary in whatever position is selected for it by the user adjusting the adjustment lever 150 as described below. All possible positions of finger mount bar 176 are offset from the shaft 170 and central axis of cylinder 42. Each finger pin 50 is individually mounted on finger mount bar by a collar. Each collar may rotate freely around finger mount bar. Each finger 50 is disposed to project through a hole 48 in the cylinder wall. Each finger 50 is slidingly engaged with its corresponding hole 48 so that it may advance and retract through it. Because of the offset position of the finger mount bar from the axis of the cylinder 42, rotation of cylinder 42 and the holes 48 integrally formed in it causes each finger 50 to rotate around the finger mount bar. Because the finger mount bar is offset, each finger 50 will advance outwards from the cylinder wall as its corresponding hole 48 rotates to a position closest to the offset finger mount bar. As a finger pin's hole 48 rotates away from and eventually 180 degrees opposite from the finger mount bar, the pin 50 will retract, reach a perigee and then as rotation continues begin to advance again to its most extended position.

Advantageously, the fingers are oriented to extend their farthest outward in a forward and downward direction relative to the position of the auger 40 over the floor plate 38 and gap 36 of the header. Thus the fingers are extended to reach out into the gap 36 and contact crop therein and, as the rotation of the cylinder advances the fingers underneath the auger, urge the crop towards the rear of the combine and towards the feeder house position. The pins 50 begin to retract as they rotate towards the rearward aspect of the cylinder, where the pins, if extended, would disadvantageously bring crop back out of the feeder house position. At the rear of the cylinder, they are effectively retracted by their offset mounting.

Due to variances in the type of crop being harvested, ground, moisture, volume, speed and other conditions, it is advantageous to the user to be able to adjust the position of maximum extension of the fingers 50. Accordingly, the shaft 170 through cam and finger mount bar may be rotated in a clockwise or counter clockwise fashion as shown in FIG. 6 by rotating the adjustment lever arm 150. In the prior art, such adjustments were typically made with a tool applied to shaft 170 when the end of the cylinder 42 is exposed. In the present invention, none of the end cones nor any other apparatus need be removed in order to adjust the fingers.

Referring now to FIG. 6, seen underneath the end cone (removed from FIG. 6) and assembled with the hanger 60 is the external access assembly for adjusting the finger pins 50. Adjustment lever 150 is engaged with the stub shaft 170 of the auger finger assembly at the axis of the auger and cylinder. At its outer, radial end lever 150 is attached to a pin 152. Pin 152 extends through an arcuate slot 154 in the hanger 60. The pin is capped on the side of the hanger opposite the lever bar 150. On the inner side of hanger 60, pin 154 is connected to an adjustment rod 156. The pin 154 has a through hole through which rod 156 extends and with which rod 156 is slidingly engaged. A lock nut 158 may be used to lock the pin 154 and rod 156 in a user selected position relative to one another. The rod 156 is anchored at anchor pin 160, which in turn is mounted on anchor pin mount 162. Anchor pin 160 may rotate within anchor pin mount 162 in order to accommodate a degree of rotation in anchor pin 160 as rod 156 rotates slightly to accommodate the travel of pin 152 along arcuate slot 154. The locking features prevent unintentional movement of the assembly that would be problematic with an exposed, unlocked lever arm.

In operation, a user may loosen the lock nuts 158 and slide pin 152 along slot 154 to a selected position, thereby rotating lever 150 to that selected position. Forward rotation of lever 150 will move the point of maximum extension of the finger pins 50 downward farther into gap 36. Rearward rotation of lever 150 will move the point of maximum extension of the finger pins 50 upwards and forwards, farther away from gap 36. Thereafter, the selected position may be locked into place with the lock nuts 158. It is apparent that the operator may reach the pin 152 and lock nut 158 holding the position of lever arm 150 and adjust the position of maximum extension of the fingers 50 entirely from outside the auger assembly, with no disassembly required.

Cross Over Gearbox

In a two drive motor configuration, the finger adjustment mechanism is placed on the side of the auger with a motor driving a single end cone. Because no power train needs to cross over the hanger between the central cylinder and the end cone, there is ample room between cylinder 42 and the end cone to accommodate the finger adjustment mechanism. However, if both end cones are driven by a single drive motor, a drive train must avoid the finger adjustment mechanism and its engagement with the stationary shaft in the central axis. Hence FIG. 10 depicts a cross over gearbox that transfers driving rotation to the end cone without interfering with the finger adjustment mechanism's engagement with the central axis of the auger.

In FIG. 10 an internal gear assembly within housing 200 is rotationally engaged with an outer gear assembly within housing 202 through offset transfer shaft 204. Through this drive train rotational power is transferred from cylinder 42 to end cone shaft 208. All gears are supported in their respective housings 200 and 202 by bearings 220.

Referring now to FIG. 8, a cutaway view depicting a single motor drive for the auger 40 and FIG. 10, a close up cutaway view of the crossover gear box, the interaction of the finger adjustment device and crossover gear box is described. Motor 104 is mounted externally but adjacent to the auger 40 at mount 108. In the depicted embodiment, motor 104 is mounted on the hanger 60 at one end of the auger. A T-gear box 110 is in driven communication with motor 104. One drive shaft 206 extends laterally to drive a near end cone 44.

On its internal aspect, drive received from the T-gear box 110 drives a substantially circular plate 230. At its outer rim, plate 230 is fixedly attached to the inner surface of cylinder 42. At its inner axis, plate 230 is supported by a bearing 234. Within bearing 234 is mounted stationary shaft 170. In the embodiment depicted in FIGS. 8 and 10, shaft 170 may extend throughout the length of the cylinder 42. The shaft 170 supports the cam and finger support bar and, as stated above, this assembly remains stationary and does not rotate. Cylinder 42 is rotated by its fixed attachment to plate 230, which is driven by motor 104 through gear box 110. A second substantially circular plate 232 is also fixedly attached to the inner surface of cylinder 42, but at its opposing end. As cylinder 42 is driven to rotate, plate 232 is likewise driven to rotate. At its inner axis, plate 232 is attached to bearing 236 which, similarly to its opposing complementary bearing 234, also supports shaft 170 so that shaft 170 may remain stationary while plate 232 rotates around it.

Plate 232 is in driving engagement with axial cylinder gear 210. Axial cylinder gear 210, being driven, proceeds to transfer drive through the outer cylinder gear 214, shaft 204, outer cone gear 216, axial cone gear 212 and cone shaft 208 in order to provide driving rotation to outer cone 46 on the opposite end of the auger 40 from the motor 104.

The axial cylinder drive gear 210 has an axial through hole of a larger diameter than the shaft 170, thereby defining a space 240 therebetween. The plate 232 being separated from shaft 170 by bearing 236 and the axial cylinder drive gear 210 being separated from shaft 170 by space 240, the shaft 170 and the finger adjustment assembly within the cylinder 42 remain stationary while the plates 230 and 232, cylinder 42 and cross over gear box transmit driving power to end cone 46. As can be seen, the crossover gear box maintains a space between the inner housings 200 and 214 and the outer housings 202 and 216 through which may extend lever arm 150 for the finger arm extension adjustment apparatus as described hereinabove.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A draper header for a combine or harvester, said header comprising:
   a header frame having a longitudinal dimension transverse to a direction of travel of said combine or harvester;
   at least two moving belts, said belts being disposed on said frame to receive cut crop from a cutter and to move the crop from an outer portion of said header towards an inner portion of said header;
   each of said belts having a leading edge oriented towards the direction of travel of said combine or harvester and a trailing edge oriented away from said direction of travel and each of said belts having an inner aspect disposed in spaced relation to an inner aspect of the other of said belts such as to define a gap therebetween, said gap receiving cut crop being transported inwardly from said belts;
   said header having no center draper substantially perpendicular to said belts and conveying crop rearwardly;
   an auger, said auger having a cylinder around an axis and two ends, at least one of said ends being oriented outwardly and said auger being disposed to urge crop from said gap towards a feeder house position behind said gap;
   a floor plate beneath said gap, said floor plate being non-moving during operations;
   said floor plate having a contour on its upper surface, said contour urging cut crop towards said feeder house position;
   said contour being a chevron with an apex oriented rearwardly.

2. The header of claim 1 further comprising a leg of said chevron being curved.

3. The header of claim 1 further comprising said contour being integral to said floor plate.

4. The header of claim 1 further comprising said gap also receiving crop directly from a center section of said cutter forward of said floor plate.

5. The header of claim 1 further comprising a drive unit operatively engaged to drive said auger.

6. The header of claim 1 further comprising said auger cylinder having fingers extending radially to urge crop towards said feeder house position.

7. The header of claim 1 further comprising said floor plate and said inner aspects of said belts defining a radiused crop feed path.

8. A draper header for a combine or harvester, said header comprising:
   a header frame having a longitudinal dimension transverse to a direction of travel of said combine or harvester;
   at least two moving belts, said belts being disposed on said frame to receive cut crop from a cutter and to move the crop from an outer portion of said header towards an inner portion of said header;
   each of said belts having a leading edge oriented towards the direction of travel of said combine or harvester and a trailing edge oriented away from said direction of travel and each of said belts having an inner aspect disposed in spaced relation to an inner aspect of the other of said belts such as to define a gap therebetween, said gap receiving cut crop being transported inwardly from said belts;
   said header having no center draper substantially perpendicular to said belts and conveying crop rearwardly;
   an auger, said auger having a cylinder around an axis and two ends, at least one of said ends being oriented outwardly and said auger being disposed to urge crop from said gap towards a feeder house position behind said gap;
   a floor plate beneath said gap, said floor plate being non-moving during operations;
   said auger further having end cones, said end cones extending outward over said inner aspects of said belts, said end cones having a flight and said end cones being disposed to urge crop from said belts towards said feeder house position.

9. The header of claim 8 further comprising said end cones having an axial cylinder, said cylinder having an outer end extending at least as far as an apex of said cone.

10. The header of claim 8 further comprising said auger cylinder having fingers extending radially to urge crops towards said feeder house position.

11. The header of claim 10 further comprising said fingers being mounted to extend further forwards than rearwards.

12. The header of claim 8 further comprising at least one of said end cones having an axial cylinder, said axial cylinder having a diameter substantially equivalent to a width of a flight on said end cone.

13. A draper header for a combine or harvester, said header comprising:
   a header frame having a longitudinal dimension transverse to a direction of travel of said combine or harvester;
   at least two moving belts, said belts being disposed on said frame to receive cut crop from a cutter and to move the crop from an outer portion of said header towards an inner portion of said header;

each of said belts having a leading edge oriented towards the direction of travel of said combine or harvester and a trailing edge oriented away from said direction of travel and each of said belts having an inner aspect disposed in spaced relation to an inner aspect of the other of said belts such as to define a gap therebetween, said gap receiving cut crop being transported inwardly from said belts;

said header having no center draper substantially perpendicular to said belts and conveying crop rearwardly;

an auger, said auger having a cylinder around an axis and two ends, at least one of said ends being oriented outwardly and said auger being disposed to urge crop from said gap towards a feeder house position behind said gap;

a floor plate beneath said gap, said floor plate being non-moving during operations;

said auger having a hanger at each end of said cylinder, said auger being rotatedly mounted on a forward aspect of said hangers and a rearward aspect of said hangers being attached to said frame of said header;

one of said rearward aspect of said hanger or said frame having a rail and the other of said rearward aspect of said hanger or said frame having a rail mount slot, a sliding engagement of said rail and said rail mount slot allowing the removal of said auger or a variation of the distance between said auger and said belts.

14. The header of claim 13 further comprising said auger is mounted on said hanger such that a distance between said auger and said belts adjusts being in response to variations in crop moving therebetween.

15. The header of claim 13 further comprising one of said cylinder and/or said hanger having a pin and the other of said cylinder or said hanger having a slot, said adjustment being by a sliding engagement of said pin and said slot.

16. The header of claim 13 further comprising said cylinder being entirely forward of said trailing edge of said belt.

17. The header of claim 13 further comprising a spaced relation being adjustable between said inner aspect of said belts and at least one of an end cone of said auger or said floor plate.

18. The header of claim 13 further comprising a compression shaft, said compression shaft being attached to an outer end of said auger and to said frame, and said compression shaft being disposed to compress cut crop conveyed beneath said compression shaft.

19. The header of claim 13 further comprising said auger being substantially parallel to said longitudinal dimension of said belts.

20. A draper header for a combine or harvester said header comprising:

a header frame having a longitudinal dimension transverse to a direction of travel of said combine or harvester;

at least two moving belts, said belts being disposed on said frame to receive cut crop from a cutter and to move the crop from an outer portion of said header towards an inner portion of said header;

each of said belts having a leading edge oriented towards the direction of travel of said combine or harvester and a trailing edge oriented away from said direction of travel and each of said belts having an inner aspect disposed in spaced relation to an inner aspect of the other of said belts such as to define a gap therebetween, said gap receiving cut crop being transported inwardly from said belts;

said header having no center draper substantially perpendicular to said belts and conveying crop rearwardly;

an auger, said auger having a cylinder around an axis and two ends, at least one of said ends being oriented outwardly and said auger being disposed to urge crop from said gap towards a feeder house position behind said gap;

a floor plate beneath said gap, said floor plate being non-moving during operations;

a hydrostatic motor unit engaged with said auger to power rotation of said auger; and said hydrostatic motor being mounted within one of said cylinder or an end cone of said cylinder.

21. The header of claim 20 further comprising a first drive unit powering said cylinder and a first end cone and a second drive unit powering an opposing end cone.

* * * * *